July 4, 1939.   H. P. FORD   2,164,737
METHOD OF MAKING BEARINGS
Filed July 24, 1936   2 Sheets-Sheet 1
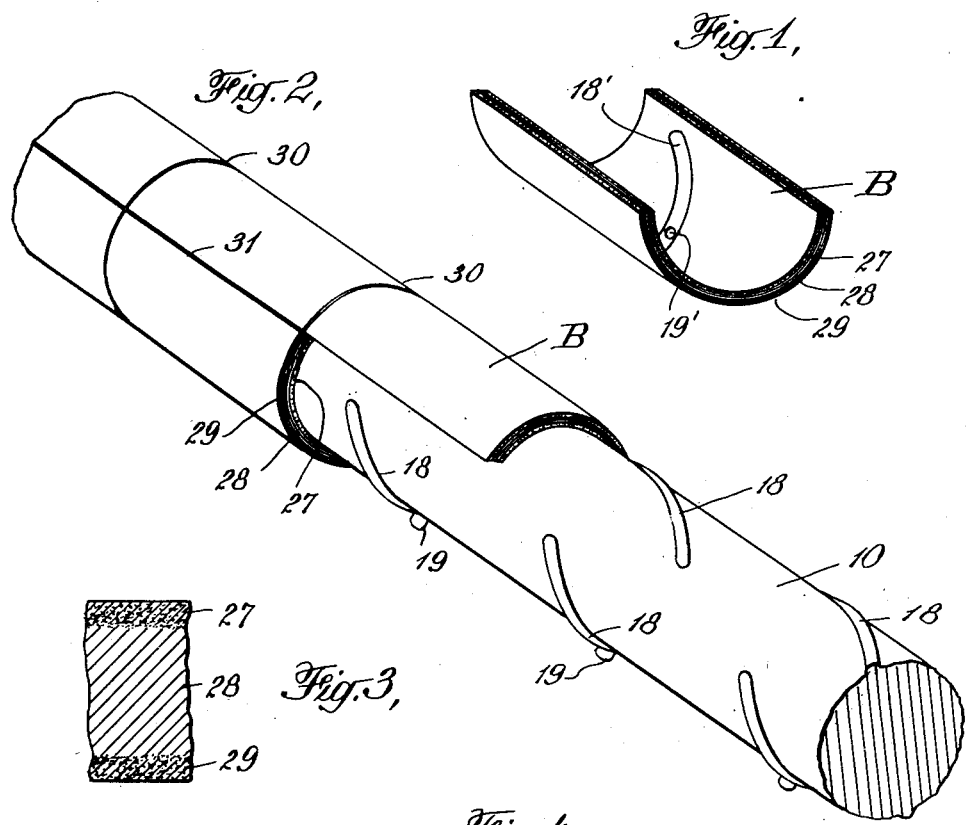
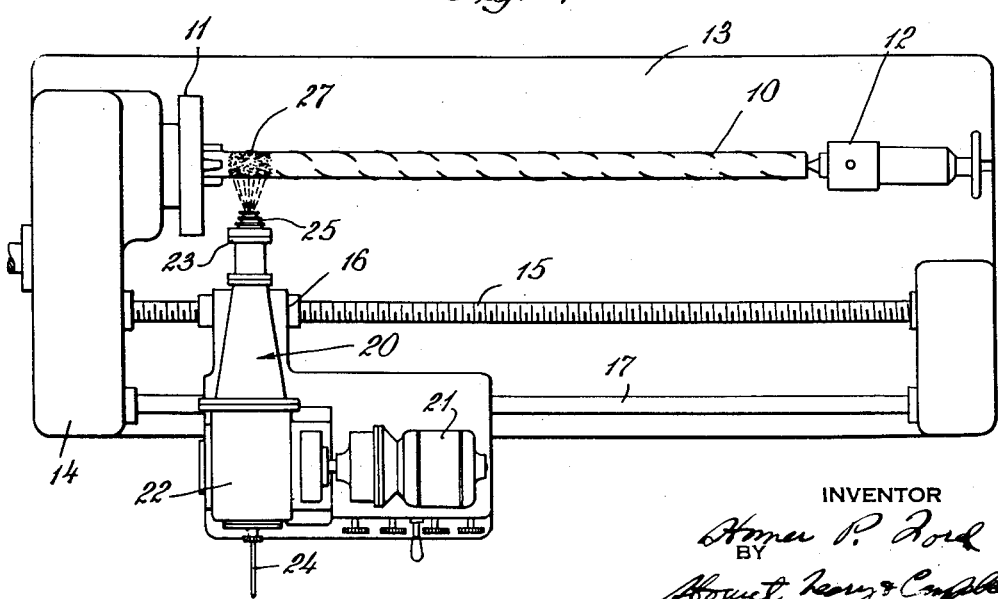
INVENTOR
Homer P. Ford
BY
ATTORNEYS July 4, 1939. H. P. FORD 2,164,737
METHOD OF MAKING BEARINGS
Filed July 24, 1936 2 Sheets-Sheet 2
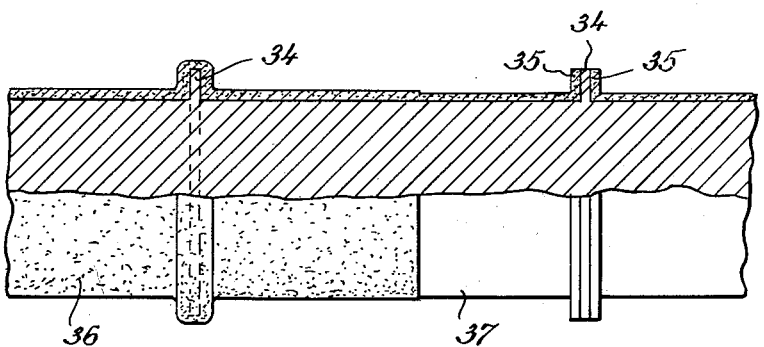
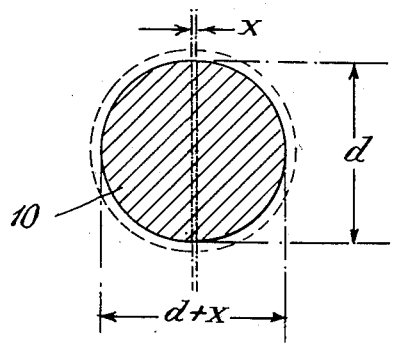 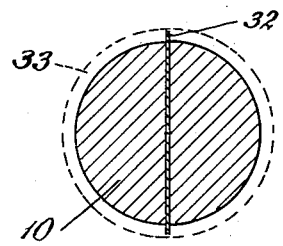
INVENTOR
Homer P. Lord
BY
ATTORNEYS Patented July 4, 1939

2,164,737

UNITED STATES PATENT OFFICE 2,164,737

METHOD OF MAKING BEARINGS

Homer P. Ford, Forest Hills, N. Y., assignor to The Gillord Corporation, New York, N. Y., a corporation of Delaware Application July 24, 1936, Serial No. 92,325

10 Claims. (Cl. 29—149.5)

This invention relates to the method of making bearings and has particular reference to the making of bearings for high speed or heavy duty shafts, such as the crank shafts of internal combustion engines or the like, although the invention is not limited to that use.

At the present time bearings are generally provided in the form of thin shells pre-shaped to substantially conform to the connecting rod or other bearing saddle and readily removable for replacement when worn. Such bearings are either made entirely of anti-friction bearing material such as babbit, bearing bronze, copper-lead, metal-graphite, or the like, or, what is more usual, the bearings constitute a backing sleeve of steel or other strong and relatively hard material faced with a thin liner of the anti-friction bearing material. The liner is either applied in the form of a sheet suitably secured to the backing sleeve, or is cast on the sleeve by a centrifugal or quiescent casting operation. In any case, the bearings are fabricated from the outside in to the bearing surface and usually require several steps and several separately formed parts for their fabrication. The net result is that the bearings are not homogeneous throughout, contain internal strains, due to temperature changes in manufacture, which reduce the life of the bearings, and are expensive to manufacture.

In accordance with the present invention, a method of making bearings of the shell type is provided, whereby the bearing is completely built up in one piece from the inside or bearing surface outwardly to any thickness and to the specific shape and dimensions without requiring a separate backing sleeve, is a homogeneous structure throughout, regardless of the number of separate materials employed in its manufacture, is free of the internal strains commonly caused by temperature changes during manufacture, and may be so constituted that the material of which it is made changes in character at different sections thereof.

More particularly, the method of this invention comprises building up a non-adhering deposit of the selected molten or heat-softened bearing material or materials on a suitable core or mandrel of the proper shape and of the effective diameter of the finished bearing, beginning with the anti-friction liner material and changing its character, either abruptly or gradually to a harder material for stiffening purposes, or continuing the deposit of the same material, or repeatedly changing the character of the material, until the bearing is built up to the proper thickness from the inside or bearing surface to the outside. The unitary deposit thus formed is homogeneous throughout and when hardened is machined to proper dimensions exteriorly and then is removed from the mandrel in substantially finished form, simply requiring a slight smoothing or finishing operation on its inner or bearing surface. The mandrel is preferably provided with parallel circumferential ribs forming the end flanges for the finished bearings, and with low axial or diagonal ridges which provide the finished bearings with oil grooves or the like. Where semi-circular or half-bearings are to be made, the mandrel is preferably elongated across one diameter of its section to compensate for the width of opposite axial saw cuts or slits required in the deposit to remove it in finished shape, or the elongated section mandrel is provided with two opposite radial ribs, which automatically divide the deposit into two semi-circular sections as the deposit is made.

The preferred method of depositing the material on the mandrel is by spraying it in finely-divided molten or heat-softened form by means of an apparatus capable of building up a homogeneous deposit of various kinds and characters of material as required. Such an apparatus is disclosed in copending application Serial No. 756,076, filed December 5, 1934, now Patent No. 2,092,150, by Purling A. Bleakley, and has proven successful for making bearings according to the present process.

It will be seen that with the process of the present invention homogeneous bearings may be rapidly built up in one piece and in one operation from molten or heat-softened material in large numbers and at low expense without requiring any other steps except simple finishing operations. The new process, by building up the bearings from the inside out, permits making bearings with a very thin bearing material deposit of any nature, since the stiffening material may be made any thickness and also be any material subject to spray-depositing operations. Likewise many different types of bearings may be so made in which the material, although homogeneous in structure, changes throughout different sections. For example, if a so-called floating bearing is desired, the last or outside deposit may be anti-friction bearing material.

For a more complete understanding of the invention reference may be had to the accompanying drawings, in which:

Figure 1 illustrates in perspective one-half of a bearing made in accordance with the process of this invention;

Fig. 2 illustrates in perspective a mandrel on which the bearing has been deposited and from which half-bearings have been slit and removed;

Fig. 3 illustrates in enlarged section the structure of the built-up bearing of this invention;

Fig. 4 is a plan view of a preferred apparatus for forming the bearing in accordance with the process of this invention;

Fig. 5 illustrates a modified form of mandrel for making flanged bearings; and

Figs. 6 and 7 are cross-sections through modifications of mandrels particularly adapted for making split or half bearings.

Referring to the drawings, numeral 10 designates a mandrel, which either may serve as an arbor or is fitted with an arbor or mounting between the head stock 11 and tail stock 12 of a lathe 13 or the like, as shown in Fig. 4. The lathe 13 is operated by suitable power means, not shown, which also drives by gearing contained in casing 14 the lead screw 15, along which is advanced a support 16 guided on suitable rail 17, this support moving at a predetermined speed lengthwise of the rotating mandrel or arbor 10. The mandrel or arbor 10 may be provided with embossed or attached ridges 18, either extending spirally as shown, or otherwise, for forming within the inner surface of the finished bearing B suitable oil grooves designated 18' in Fig. 1. Pins 19 attached or connected to the ridges 18 of the mandrel 10 form the oil holes 19' in the finished bearing shown in Fig. 1.

Mounted on the moving support 16 is a metal spray apparatus 20 preferably of the type disclosed in said patent. This apparatus 20 includes a motor 21 for driving feeding means enclosed in housing 22 for advancing to the melting zone in head 23 a wire or rod 24 of material to be spray-deposited. The wire or rod 24 may be a composite of two or more dissimilar metals, such as copper and lead, as described in copending application Serial No. 63,587, filed February 12, 1936, by Purling A. Bleakley, or a homogeneous rod of a single metal or alloy, or either form of rod may be associated with a fluent material distributing device for impregnating the finely-divided molten rod material issuing from a nozzle 25 with the fluent material, such as pulverized graphite or metal, so that as the molten material hardens the fluent material is intimately mixed therewith mechanically, chemically, or in solution.

The material of rod or wire 24 is molten or heat-softened in the melting zone of head 23 of the apparatus 21 by the combustion of a mixture of acetylene and oxygen, or the like. The molten material is conveyed out of the melting zone through the nozzle 25 to the place of deposit and is simultaneously finely-divided by a gaseous envelope moving at a high rate of speed and maintaining the pencil of molten material within it at superatmospheric pressure for the purpose of preventing cooling and volatilization thereof, so that it reaches the place of deposit in a molten or thermo-plastic state. The conveying gaseous envelope may be air, and it is rendered inert or non-oxodizing by a quantity of an auxiliary gas, such as hydrogen, acetylene, or the like, or the auxiliary gas may be a gas specifically reacting chemically with the molten or thermo-plastic material to change its form in its course from the nozzle 25 to the place of deposit. The apparatus 20 is described in greater detail in said patent.

The mandrel 10 is preferably formed of case-hardened steel or other material, and its surface is made relatively smooth, such as by grinding operation, but it is not polished so that the molten material does not slip off before hardening. The hardened material is not bonded or otherwise adhered to the mandrel 10 and can be readily removed therefrom. The effective diameter of the mandrel 10 substantially conforms to the interior diameter of the bearing for a purpose to be described.

Where the built-up bearing to be formed is of the type comprising a lining of anti-friction bearing material and a stiffening or backing sleeve, the anti-friction material of any desired form and thickness is deposited first upon the mandrel 10 by means of the spray apparatus 20, which is advanced by lead screw 15 along the mandrel 10 as the latter rotates at such a speed that the spray deposited material is laid thereon at the proper thickness coordinated with the rate of movement of the apparatus 20 by the lead screw 15. With this arrangement, the bearing material is deposited spirally on the mandrel 10, the deposited material being designated 27 in Figs. 1, 2 and 3, which illustrate it in exaggerated thickness in the interest of clarity. As a matter of fact, the bearing material 27 may be only .015 inch in thickness in the finished bearing, although it is obvious that it may be made as thin or as thick as desirable. The material 27 may also be deposited on the mandrel by oscillating the apparatus 20, or by building up the material at once instead of by repeated passes.

The bearing material 27 may be a mechanical mixture of copper and lead, such as disclosed in the aforementioned application Serial No. 63,587; it may be a metal-graphite bearing, or it may be a bearing alloy material such as babbit, bearing bronze, or the like, all depending upon requirements. Also, the mandrel 10 and the driving mechanism for the apparatus 20 may be arranged in any way desirable, such as by preforming straight cylindrical bearing blanks on a single mandrel, as illustrated in Fig. 3, or flanged bearing blanks, as illustrated in Fig. 5.

Where the bearing material 27 is to be stiffened or provided with a supporting backing, steel, a ferroalloy, a non-ferrous metal, a non-ferrous alloy, such as beryllium-copper, or the like, is bonded upon the bearing material 27 in any desired thickness as indicated at 28 in Figs. 1, 2 and 3. The steel 28 is of such temperature when it reaches the place of deposit, namely, bearing material 27, and the latter is usually of such lower melting metal as copper-lead or babbit, or the like, that a thermal bond is formed between the two materials 27 and 28 without other preparation, the surface of the bearing material 27 remaining relatively rough to secure initial friction adhesion of the backing material 28. Even with high bearing material 27, the backing material 28 may be applied with a good thermal-bond before the material 27 has cooled, or the nozzle 25 of the apparatus 20 may be placed sufficiently closely to the material 27 so that its flame preheats the surface thereof to secure the thermal bond between it and the deposited material 28.

Preferably, however, there is no substantial interruption in the deposit of the different materials 27 and 28, a wire rod 24 of the material 28 being fed into the apparatus 20 immediately following the material 27, or the two materials may be merged, i. e., the material 28 may be supplied along with the material 27, the latter being reduced in quantity as supplied until only material 28 remains to be deposited. This may be done by means of a composite rod or wire 24 of the two materials 27 and 28 in gradually varying volumes, or by simultaneously feeding two wires or rods 24 of the different materials 27 and 28 to the melting chamber, or by means of two apparatus 20 simultaneously spraying the two materials at the same time. In this way the entire deposit is not only homogeneous, but changes in character at different sections thereof, which change may be gradual or abrupt, as desired.

Where a so-called floating bearing is to be formed, a third material, preferably anti-friction or bearing material 29, similar to or the same as bearing material 27, may be applied on material 28 as is illustrated in Figs. 1 and 2. It is to be understood, however, that the built-up bearing of this invention may be constituted solely of bearing material 27, in which event the stiffening material 28 is not applied; or the built-up bearing of this invention may constitute simply the materials 27 or 28 of any desired over-all thickness, the material 28 being substantially thicker than material 27; or a three-material or section floating bearing constituting materials or sections 27, 28 and 29 may be formed of any desirable thickness.

After completion of the built-up bearing of this invention, whether it constitutes material 27 alone, materials 27 and 28, or materials 27, 28 and 29, the outer surface of the bearing deposit on mandrel 10 is smoothed and dressed down to the proper diameter for fitting in the saddle of the connecting rod or the like on which the finished bearing is to be mounted. Obviously for convex bearings the process is reversed, that is, the surface 29 becomes the bearing surface, which may be backed by the steel or stiffening material 28 if desired, and also by the additional floating surface material 27. In that event, the surface of 29 may be polished for the reception of the engaging bearing surface.

The built-up bearing of this invention is then stripped from the mandrel 10 by a slitting operation such as saw-cutting, milling or shearing. Where a plurality of straight cylindrical bearings are made in the manner illustrated in Fig. 3 on a long mandrel 10, the individual half-bearings B are cut therefrom by circular saw-cuts 31. After these cuts have been made the half-bearings B can be stripped without distortion and the oil groove 18 and oil hole 19' are formed in the inner or bearing surface, as illustrated in Fig. 1.

In order to secure the proper size for the half-bearings B the mandrel 10 is preferably formed with a diameter substantially equal to the internal diameter of the finished bearing. When the longitudinal saw-cuts 31 are made, they reduce the interior and exterior diameters of the two opposite or complementary half-bearings B by the thickness of the saw-cut 31, leaving a slight space between their adjacent edges when mounted on the connecting rod, for example. This slight spacing is ordinarily not objectionable and may serve as oil grooving, but it can be avoided by increasing the dimension of the section of the mandrel 10 across a diameter by the width of the saw-cut. Thus, if $x$ is the width of the saw-cut and $d$ the normal diameter of the mandrel, its diameter at right angles to the normal diameter is $d+x$, as illustrated in Fig. 6. Alternatively, the mandrel 10 may be split axially and its two halves spaced apart by a thin shim 32, the opposite edges of which project beyond the corresponding surfaces of the mandrel 10 by an amount substantially equal to the intended thickness of the finished bearing, so that after the outside of the deposit 33 has been machined to overall diameter of the shim 32 the half-bearings are complete without requiring slitting from the mandrel. A cam lathe is necessary to machine the deposit on the mandrels of Figs. 6 and 7, because of their elongated sections.

The method of this invention may be employed to form half-bearings B in the manner described or full bearings by slitting the built-up deposit with only one longitudinal or axial cut 31, so that a flexible split bearing is provided. Also, an unslit full bearing may be provided by making mandrel 10 collapsible in any suitable manner, or by tapering the mandrel slightly to facilitate removal of the deposit therefrom, where it is not desired to make the mandrel 10 collapsible.

When flanged bearings are to be made, the mandrel 10 is preferably provided with the circumferential flanges 34 spaced apart the amount of the overall length of the finished bearing, plus some allowance for finishing, as shown in Fig. 5. The diameter of the flange 34 is substantially equal to the diameter of the finished flange 35 on the bearing, so that when the deposit 36 is machined to size, as indicated at 37, the edges of the flanges 34 and 35 are flush. Oil groove and hole forming ridges and projections like those shown in Fig. 2 may be provided on the mandrel of Fig. 5.

Spray-deposited molten metals or other materials may be, because of their nature, somewhat porous, the thermoplastic particles flattening out when engaging the surface upon which they are directed because of their impact and bonding to that surface because of their temperature but leaving minute voids or discontinuous pores between adjacent particles. In some instances, these voids or pores may not be desirable, and accordingly, they are closed or minimized in total volume by compacting the spray-deposited material either by impact, pressure or the like, which may be performed before or after the bearing is removed from the mandrel. It has been found, however, that for most purposes, the presence of the voids is desirable for they form pockets for the reception of lubricant, whether oil, graphitic, or the like.

Although the invention has been described as applied to the making of bearings, and is, in fact, particularly adapted for that purpose, the invention is not limited to making bearings, but may be employed to produce any product which is susceptible to being built-up in homogeneous, unitary, pre-formed condition in the manner described.

I claim:

1. The method of making concave bearings or the like, which comprises building up on a suitable cylindrical form radially outwardly from the inner concave bearing surface a non-adhering homogeneous structure of initially finely-divided heat-softened material under pressure, and stripping said entire built-up structure from said form.

2. The method of making concave bearings or the like, which comprises building up on a suitable cylindrical form radially outwardly from the inner concave bearing surface a non-adhering homogeneous structure of initially finely-divided heat-softened material under pressure, and changing the character of the material as the building up process progresses, and stripping said entire built-up structure from said form.

3. The method of making concave bearings or the like, which comprises building up on a suitable cylindrical form radially outwardly from the inner concave bearing surface a non-adhering homogeneous structure of initially finely-divided heat-softened material under pressure, and gradually changing the character of the material as the building up process progresses, and stripping said entire built-up structure from said form.

4. The method of making concave bearings or the like, which comprises building up on a suitable cylindrical form radially outwardly from the inner concave bearing surface a non-adhering homogeneous structure of initially finely-divided heat-softened material under pressure and abruptly changing the character of the material as the building-up process progresses, and stripping said entire built-up structure from said form.

5. The method of making concave bearings or the like, which comprises building up on a suitable cylindrical form radially outwardly from the inner concave bearing surface a non-adhering homogeneous structure of initially finely-divided heat-softened material under pressure, and changing the material as the building up process progresses, and stripping said entire built-up structure from said form.

6. The method of making bearings or the like, which comprises depositing on a cylindrical form substantially conforming to the shape of the finished bearing a non-adhering finely-divided heat-softened material, continuing the depositing operation with a different heat-softened material to form a homogeneous composite structure, and stripping the entire spray deposited hardened structure from the form.

7. The method of making bearings or the like, which comprises depositing on a cylindrical form substantially conforming to the shape of the finished bearing a spray of non-adhering finely-divided heat-softened material consisting of anti-friction bearing material, continuing the spray with a finely-divided heat-softened backing material, changing the spray to a finely-divided heat-softened anti-friction bearing material, and stripping the entire spray deposited hardened composite structure from the form.

8. The method of making bearings, which comprises spraying on a form a non-adhering heat-softened bearing material to produce a tubular structure, slitting the entire spray deposited hardened structure substantially axially to loosen it on the form, and stripping it from the form.

9. The method of making bearings, which comprises, spraying a non-adhering heat-softened bearing material on a cylindrical form having spaced peripheral fins to produce a tubular structure thereon having flanges at either extremity, slitting the hardened structure substantially axially to loosen it on the form, and stripping it from the form.

10. The method of making bearings, which comprises, spraying a non-adhering heat-softened bearing material on a cylindrical form having spaced peripheral fins on the surface thereof, to deposit a tubular structure thereon, machining the outer surface of the hardened structure to remove a portion of the deposited material down to the edge of the fins, and thus divide the structure into spaced axial sections, and stripping the several sections thus produced from the form.

HOMER P. FORD.